United States Patent
Funke-Schaeff et al.

(10) Patent No.: US 7,469,286 B2
(45) Date of Patent: Dec. 23, 2008

(54) DATA-TRANSPARENT MEASUREMENT MANAGEMENT SYSTEM

(75) Inventors: Sabine Funke-Schaeff, Aidlingen (DE); Albrecht Schroth, Herrenberg (DE)

(73) Assignee: Agilent Technologies, Inc., Santa Clara, CA (US)

( * ) Notice: Subject to any disclaimer, the term of this patent is extended or adjusted under 35 U.S.C. 154(b) by 861 days.

(21) Appl. No.: 10/409,418

(22) Filed: Apr. 8, 2003

(65) Prior Publication Data

US 2004/0054773 A1 Mar. 18, 2004

(30) Foreign Application Priority Data

Sep. 12, 2002 (EP) .................................. 02020359

(51) Int. Cl.
*G06F 15/173* (2006.01)
(52) U.S. Cl. ....................................... 709/224; 700/286
(58) Field of Classification Search ................ 709/217, 709/246; 707/203; 700/19, 83, 286, 295; 714/47; 705/35, 2; 715/763; 717/105
See application file for complete search history.

(56) References Cited

U.S. PATENT DOCUMENTS

| | | | | |
|---|---|---|---|---|
| 5,999,947 | A * | 12/1999 | Zollinger et al. ............. 707/203 |
| 6,064,812 | A * | 5/2000 | Parthasarathy et al. ...... 717/105 |
| 6,201,996 | B1 | 3/2001 | Crater et al. .................... 700/9 |
| 6,321,236 | B1 * | 11/2001 | Zollinger et al. ............. 707/203 |
| 6,370,569 | B1 * | 4/2002 | Austin ........................ 709/217 |
| 6,430,615 | B1 * | 8/2002 | Hellerstein et al. .......... 709/224 |
| 6,437,805 | B1 * | 8/2002 | Sojoodi et al. ............... 715/763 |
| 6,449,624 | B1 * | 9/2002 | Hammack et al. ........... 707/203 |
| 6,502,131 | B1 * | 12/2002 | Vaid et al. .................... 709/224 |
| 6,513,019 | B2 * | 1/2003 | Lewis .......................... 705/35 |
| 6,625,651 | B1 * | 9/2003 | Swartz et al. ................ 709/226 |
| 6,640,145 | B2 * | 10/2003 | Hoffberg et al. .............. 700/83 |
| 6,938,080 | B1 * | 8/2005 | Kahveci et al. .............. 709/223 |
| 6,993,527 | B1 * | 1/2006 | Raman et al. ................ 707/100 |
| 7,023,979 | B1 * | 4/2006 | Wu et al. ................ 379/265.11 |
| 7,028,225 | B2 * | 4/2006 | Maso et al. .................... 714/47 |
| 7,158,943 | B2 * | 1/2007 | van der Riet .................. 705/14 |
| 7,188,003 | B2 * | 3/2007 | Ransom et al. ............. 700/286 |

(Continued)

FOREIGN PATENT DOCUMENTS

EP 0 389 683 10/1990
JP 2001174966 A * 6/2001

OTHER PUBLICATIONS

System for electromotive force standards comparison based on virtual instrument☐☐Pantellic-Babic, J.; Jankovic, V.; Bosnjakovic, P.;☐☐Instrumentation and Measurement, IEEE Transactions on☐☐vol. 51, Issue 6, Dec. 2002 pp. 1295-1299.*

(Continued)

*Primary Examiner*—Thong H Vu
(74) *Attorney, Agent, or Firm*—Marc Bobys

(57) ABSTRACT

A measurement management system adapted to communicate with one or more measurement instruments, comprises at least one driver, each being adapted for communicating with at least one measurement instrument, a database adapted for storing information, and a processing unit adapted for processing information. Data communication within the measurement management system is provided using an MMS data format, in which data content is separated from information about presentation or representation of the data content.

12 Claims, 1 Drawing Sheet

U.S. PATENT DOCUMENTS

| | | | |
|---|---|---|---|
| 2002/0016815 A1 | 2/2002 | Hardy et al. | 709/203 |
| 2002/0062068 A1 | 5/2002 | Gritzbach et al. | 600/300 |
| 2002/0161606 A1* | 10/2002 | Bennett et al. | 705/2 |
| 2003/0023459 A1* | 1/2003 | Shipon | 705/2 |
| 2003/0037119 A1* | 2/2003 | Austin | 709/217 |
| 2003/0061212 A1* | 3/2003 | Smith et al. | 707/6 |
| 2003/0083910 A1* | 5/2003 | Sayal et al. | 705/7 |
| 2003/0163555 A1* | 8/2003 | Battou et al. | 709/223 |
| 2003/0233250 A1* | 12/2003 | Joffe et al. | 705/2 |
| 2005/0138083 A1* | 6/2005 | Smith-Semedo et al. | 707/200 |
| 2005/0250440 A1* | 11/2005 | Zhou et al. | 455/12.1 |
| 2006/0200253 A1* | 9/2006 | Hoffberg et al. | 700/19 |
| 2006/0294183 A1* | 12/2006 | Agnoli et al. | 709/203 |

OTHER PUBLICATIONS

Evaluation of interference during collaborative document development Campbell, J.D.; Enabling Technologies: Infrastructures for Collaborative Enterprises, 2001. WET ICE 2001. Proceedings. Tenth IEEE International Workshops on Jun. 20-22, 2001 pp. 108-113.*

A multimedia networking-based approach to the development of distributed virtual instruments Fortino, G.; Nigro, L.; Instrumentation and Measurement Technology Conference, 1999. IMTC/99. Proceedings of the 16th IEEE vol. 3, May 24-26, 1999 pp. 1863-1867 vol. 3.*

European Search Report, Application No. EP 02 02 0359, dated Dec. 5, 2002.

Momal, "Integrating a Commercial Industrial Control System to the Accelerator Control System: A Case Study," Amsterdam, NL, vol. A352, No. 1, Dec. 15, 1994, pp. 464-466.

* cited by examiner

DATA-TRANSPARENT MEASUREMENT MANAGEMENT SYSTEM

BACKGROUND OF THE INVENTION

The present invention relates to measurement management systems.

Measurement instruments are applied to execute various measurement tasks in order to measure any kind of physical parameter. Most of today's measurement instruments use a bus architecture applying a command and communication standard to implement test and measurement, as explained in detail in the article "Bus-Architekturen für die Messtechnik" by John Pieper and Carsten Schilling in Elektronik-Industrie, 11-1999. Each instrument has a specific driver with instrument specific commands. In an application layer, a programming software implements interfaces to each measurement instrument and converts the measurement instrument specific information in order to communicate with the measurement instrument. The programming software further stores resulting data in a database and allows visualizing or manipulating such resulting data using various user interfaces.

SUMMARY OF THE INVENTION

It is an object of the present invention to provide an improved application layer for measurement instruments. The object is solved by the independent claims. Preferred embodiments are shown by the dependent claims.

According to present invention, a measurement management system (MMS) is provided adapted to communicate with one or more measurement instruments (MI). The measurement management system comprises at least one driver each for communicating with at least one measurement instrument, a database adapted for storing information, and a processing unit adapted for processing information.

The measurement management system might further comprise at least one user interface allowing giving access to a user to the measurement management system. Such user interface might comprise at least one of the following: a reporting tool for reporting measurement related data, a graphical user interface for graphically representing information, a non-graphical user interface for representing information in text format only, an interface to provide access to the internet or a mobile device (such as a cell-phone, PDA, pocket PC, etc.), etc.

Data communication within the measurement management system is provided using an MMS data format. In the MMS data format, data content is separated from information about presentation or representation of the data content, or in other words, data content is separated from its presentation. Data is preferably represented in a string, and more preferably in a generic string, which is not device specific.

The MMS data format preferably has a generic format, so that e.g. data doesn't describe specific measurement settings for a specific measurement instrument but measurement methods valid for each measurement instrument. Thus, the measurement instrument can be replaced with another instrument, and the data communication keeps the same.

Using the MMS data format, the data communication does not need a translation at each recipient (e.g. a specific measurement instrument). In case the data with the MMS data format is transferred at many points, only each end recipient might need to provide a translation of the data format. For transferring only, the data communication need not be migrated or translated.

The invention thus provides a transparent data communication within the measurement management system.

In one preferred embodiment, the MMS data format of data communication within the measurement management system is provided using a standard XML (extensible Markup Language) as defined in e.g. by the World Wide Web Consortium (W3C) as described e.g. under http://www.w3.org/XML/. XML data might be transformed in other kind of XML data using e.g. the extensible Stylesheet Language (XSL) and represented in any kind of graphical user interface using e.g. the so-called XML Stylesheets.

In a preferred embodiment, at least one driver of the measurement management system is adapted to provide data communication with one or more measurement instruments also using the same MMS data format. The driver thus represents a generic interface towards each coupled measurement instrument. This, however, requires that each thereto-coupled measurement instrument supports data communication using the MMS data format. In case the measurement instrument does not support such data communication, a measurement instrument specific driver might be provided for the measurement management system in order to establish data communication there between.

In operation, the measurement management system might initiate and/or control a measurement task to be executed by a coupled measurement instrument, and/or request or receive status information or measurement related data from a coupled measurement instrument. It goes without saying that multi-tasking might be provided in e.g. in order to initiate or control plural measurement tasks or send or receive information with one or more coupled measurement instruments.

In case data from the measurement instrument is provided to the driver of the measurement management system already using the MMS data format, all data communication within the measurement management system can then be executed without requiring to (re-)convert or translate the MMS data format e.g. for storing in the database or processing the processing unit. This is since the transition doesn't need the knowledge of the semantic of the data, because the data is transferred but not manipulated or presented. If the computer platforms, the data storages, and the data communication buses support the same technology, the data can be parsed and stored without data translation or migration. Accordingly, a data communication from a provided user interface of the measurement management system can be handled and transferred within the measurement management system without requiring data format conversion. In case that the coupled measurement instrument(s) supporus data communication using the MMS data format, no data format conversion is required e.g. for a data communication between a specific user interface and a specific measurement instrument, thus providing a fully transparent data communication between measurement interface to user interface.

The invention can be partly or entirely embodied or supported by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF EMBODIMENTS OF THE INVENTION

Figure 1:
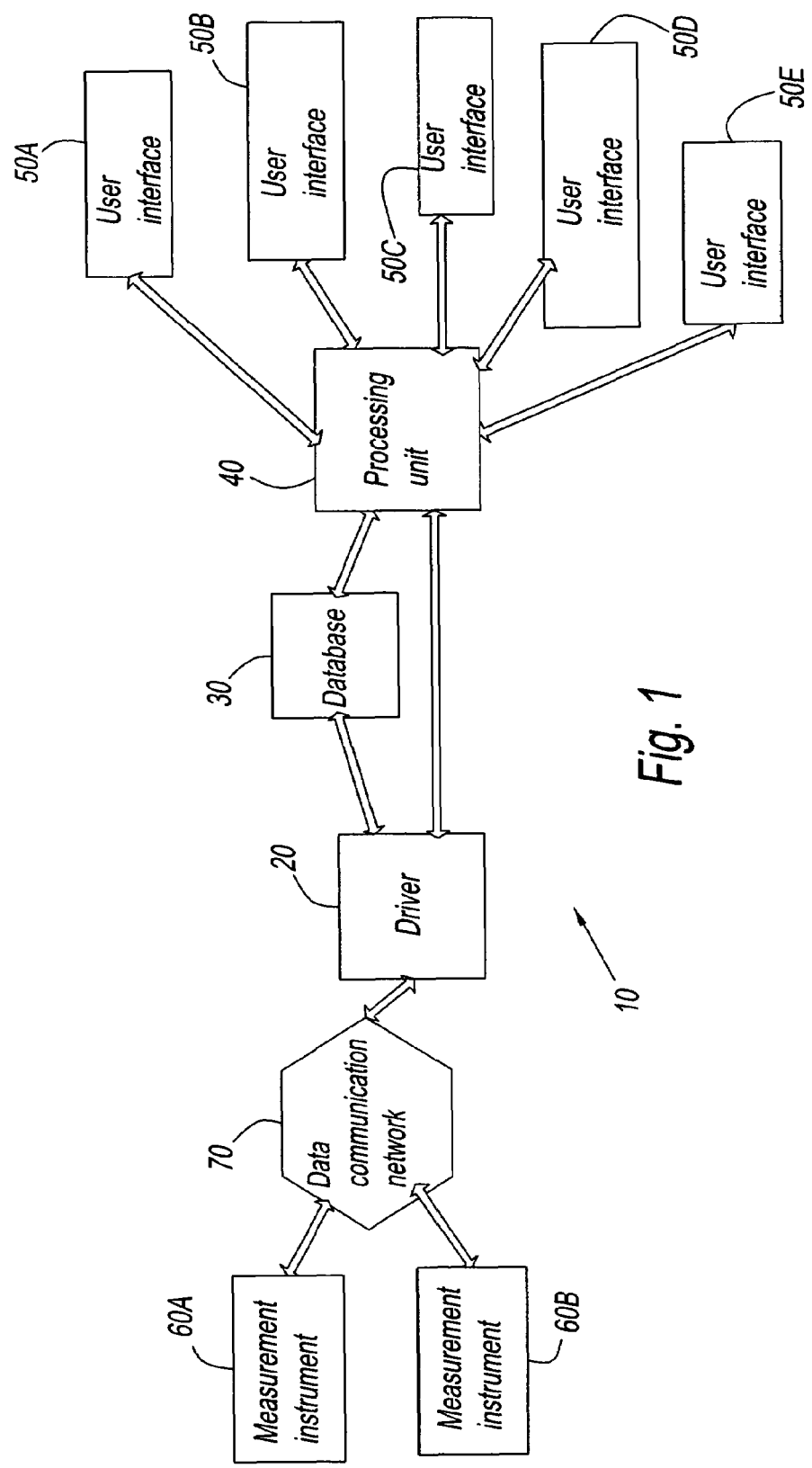
FIG. 1 illustrates an example according to the present invention.

In FIG. 1, a measurement management system (MMS) 10 comprises a driver 20, a database 30, a processing unit 40 and a plurality of user interfaces 50A-50E. Measurement instruments (MI) 60A, 60B etc. can be coupled to the driver 20 through any kind of data communication network 70, which might be wired or wireless.

In the example of FIG. 1, the MMS 10 comprises a user interface 50A as a reporting tool for reporting measurement related data, a graphical user interface 50B for graphically representing information, a non-graphical user interface 50C for representing information in text format only, an interface 50D to provide access to the internet, and an interface 50E to provide access to a mobile device (such as a cell-phone, PDA, pocket PC, etc.).However, other or further interfaces might be provided accordingly.

Data communication within the MMS 10 is provided using an MMS data format. In the MMS data format, data content is separated from information about presentation or representation of the data content. In the example here, data is represented in a generic string, which is not device specific, and using the aforementioned generic and transparent XML data. The MMS data format describes constant function (e.g. reset) or measurement functions (for example a time domain reference measurement), which can be translated from all instruments, vendor independent and instrument independent. The measure function description, the physical data and measure instructions have specific meanings for different instruments. For that, the XML Data of the MMS data format uses key words, as standard definitions, which can be understood by each measuring instrument.

Appendix A describes as an example a Time Domain Reflection Measurement Instruction. The XML Data example "Meas1" contains key words like "time domain reflection" describing the measurement function for optical time domain reflector instruments. Also the data describes physical settings for the instruments like: "threshold" with "Link Loss", "Reflectance", "Insertion Loss" and "Attenuation". These are parameter settings for the instruments.

Additional measurement schedules are defined in this example, like measurement periods of 3 seconds. All these information are analyzed from the instrument and executed in the instrument.

Other information like measurement names, include with <general>. . . </general>tags, are useful information for the presentation, like user interfaces (nr 50A to 50E in FIG. 1). There is no limit about the number of that information.

The physical parameters are settings or execution rules for the instrument, see in between the tags <physical>and </physical>, and the number are variable for each different measurement function.

The measurement result can as well be described in different ways, as shown in an example in Appendix B. The XML Data result contains also key words like "measurements", "general", "physical" and "result". In this example the result is a trace spectrum for a time domain reflection measurement. Using predefined key words are the assumption both the instrument to understand the process settings and instruction and the user interface to setup the instruction and displays the data. The rest of the system and the transfer medium have no constraints about any names and text data.

All kind of user interfaces or tools like—in the example of FIG. 1—the reporting user interface 50A, the web interface 50D, graphical 50B and non-graphical 50C interfaces, mobile device user interfaces 50E, and other (non-shown) GUI's all use as basis the same XML Data (see "Meas1" measurement function in Appendix A, and" and "Meas1Result" result data in Appendix B). With different XML style sheets and different processing (provided by the processing unit 40) the instrument setup, start of measurement and analyzing of result data is translated to the different presentation.

Information with the same format, for example "Meas1" XML Data have simple and generic interfaces, like "Setup Instrument", "Start Measurement" and "Measurement Results". Those simple interfaces can be the same for all instruments, the user interface communicates and controls the instrument with these simple mechanisms. The data above may have different information for different instruments, and the information bus is always the same for all instruments, just parsing the data file in all directions.

Each application system needs only one driver 20, which parses the generic text files to the instruments 60 or the result from the instrument to the application. (Today each instruments needs a specific driver on the client, which knows the instrument and the available command set). With this solution, the data with the generic format describes the function and only the instrument 60 has to translate the data and process the functions.

Storing these data in the database 30 and transferring data to the user interfaces 50 has always the same mechanism, the whole data file can be stored in the database 30 without interpretation data. The access to the data and the transport of the data is always the same simple way. Also modeling of different instrument architectures in the database or in the application is not required.

XML Data Format is just an example for a useful generic format, but any kind of generic data description, running at different operation systems and different kind of devices like "XML Data as text file" do, can be used according to the present invention.

Appendix A: XML Data measurement function example "Meas1"

```
<measurements>
    <time domain reflection>
        <physical>
            <time periodic="true" unit="minutes">
                <name>periodic measurements </name>
                <value>3 </value>
        </physical>
        <measurement>
            <general>
                <name>Measurement ID </name>
                <value>Test Measurement1 </value>
            </general>
            <physical>
                <threshold>
                    <physical>
                    <Link Loss>
                    <physical unit="dB">
                    <name>Warning </name>
                    <value>3 </value>
                    </physical>
                    </physical unit="dB">
                    <name>Error </name>
                    <value>7 </value>
```

```
        </physical>
      </Link Loss>
      <Reflectance/>
      <Insertion Loss/>
        <Attenuation/>
        </physical>
      </threshold>
    </physical>
    <physical>
      <date>Aug. 14, 2002 16:54:00 </date>
    </physical>
  </measurement>
  <measurement>
    <general>
      <name>Measurement ID </name>
      <value>Test measurement 2 </value>
    </general>
  </measurement>
 </time domain reflection>
</measurements>
```

Appendix B: XML Data measurement result example "Meas1Result"

```
<measurements>
  <time domain reflection>
    <measurement>
      <general>
        <name>Measurement ID </name>
        <value>Test Measurement1 </value>
      </general>
      <physical>
        <date>Aug. 14, 2002 16:54:00 </date>
      </physical>
      <result type="graphical">
        <diagram dimension="2">
          <dimension unit="km" granularity="0.005">
            <value type="linear"/>
          </dimension>
          <dimension unit="dB" type="exponential">
            <value>30;26;27;28;26; . . . . 29;10;10;19</value>
          </dimension>
        </diagram>
      </result>
    </measurement>
  </time domain reflection>
</measurements>
```

The invention claimed is:

1. A measurement system comprising:
a measurement instrument adapted for measuring a physical parameter, and
a measurement management system adapted to communicate between a user interface and the measurement instrument, wherein the user interface provides a user access to the measurement management system, the measurement management system comprising:
  a driver adapted for communicating with the measurement instrument,
  a database adapted for storing information resulting from the communicating with the measurement instrument, and
  a processing unit adapted for processing the information,
wherein a data communication within the measurement management system as well as between the measurement management system and the measurement instrument is provided without data format conversion because the information is expressed in a data format directly at the point of measurement, wherein in the data format, data content is separated from information about presentation or representation of the data content.

2. The measurement system of claim 1, wherein the user interface is at least one of a group comprising: a reporting tool for reporting measurement related data, a graphical user interface for graphically representing information, a non-graphical user interface for representing information in text format only, an interface to provide access to the internet, and an interface to provide access to a mobile device.

3. The measurement system of claim 1, wherein data in the data format is represented in at least one of the following group comprising: a device-independent string, a device-independent generic string, a generic format, a generic format applicable for the measurement instruments, a standard eXtensible Markup Language XML.

4. The measurement system of claim 1, wherein at least one driver is adapted to provide data communication with one or more of the measurement instruments also using the same MMS data format.

5. A method for operating a measurement system, the measurement system comprising:
a measurement instrument adapted for measuring a physical parameter, and
a measurement management system adapted to communicate between a user interface and the measurement instrument, wherein the user interface provides a user access to the measurement management system, the measurement management system comprising:
  a driver adapted for communicating with the measurement instrument,
  a database adapted for storing information resulting from the communicating with the measurement instrument, and
  a processing unit adapted for processing the information, the method comprising:
expressing the information in a data format directly at the point of measurement wherein in the data format, data content is separated from information about presentation or representation of the data content; and
providing a data communication within the measurement management system as well as between the measurement management system and the measurement instrument, without data format conversion, because the information is expressed in the data format directly at the point of measurement.

6. The method of claim 5, wherein the data communication comprises at least one of:
initiating a measurement task to be executed by the measurement instrument, controlling a measurement task to be executed by the measurement instrument, requesting status information or measurement related data from the measurement instrument,
receiving status information or measurement related data from the measurement instrument,
storing information in the database,
processing information by the processing unit.

7. A storage media, comprising instructions that control a processor to execute the method of claim 5.

8. The measurement system of claim 1, further comprising:
a plurality of measurement instruments, each for measuring a physical parameter.

9. The measurement system of claim 8, wherein the measurement management system comprises a plurality of drivers, each of the plurality of drivers being adapted for communicating with at least one of the measurement instruments.

10. The measurement system of claim 1, wherein the measurement instrument is coupled to the driver through a data communication network.

11. The measurement system of claim 1, wherein the data communication within the measurement management system comprises at least one of:

initiating a measurement task to be executed by the measurement instrument, controlling a measurement task to be executed by the measurement instrument, requesting status information or measurement related data from the measurement instrument, receiving status information or measurement related data from the measurement instrument, storing information in the database, and processing information by the processing unit.

12. The measurement system of claim 1, wherein the driver represents a generic interface towards the measurement instrument.

* * * * *